(12) United States Patent
Hoffmann et al.

(10) Patent No.: US 12,026,944 B2
(45) Date of Patent: Jul. 2, 2024

(54) GENERATION OF DIGITAL CULTIVATION MAPS

(71) Applicant: BASF Agro Trademarks GmbH, Ludwigshafen (DE)

(72) Inventors: Holger Hoffmann, Langenfeld (DE); Christian Bitter, Langenfeld (DE); Ole Peters, Langenfeld (DE); Bjoern Kiepe, Langenfeld (DE)

(73) Assignee: BASF Agro Trademarks GmbH, Ludwigshafen (DE)

( * ) Notice: Subject to any disclaimer, the term of this patent is extended or adjusted under 35 U.S.C. 154(b) by 157 days.

(21) Appl. No.: 16/756,316

(22) PCT Filed: Oct. 18, 2018

(86) PCT No.: PCT/EP2018/078632
§ 371 (c)(1),
(2) Date: Apr. 15, 2020

(87) PCT Pub. No.: WO2019/081349
PCT Pub. Date: May 2, 2019

(65) Prior Publication Data
US 2020/0242358 A1    Jul. 30, 2020

(30) Foreign Application Priority Data
Oct. 24, 2017 (EP) .................................. 17198036

(51) Int. Cl.
*G06V 20/10* (2022.01)
*A01B 79/00* (2006.01)
*G06T 17/05* (2011.01)

(52) U.S. Cl.
CPC .......... *G06V 20/188* (2022.01); *A01B 79/005* (2013.01); *G06T 17/05* (2013.01)

(58) Field of Classification Search
CPC .... G06V 20/188; A01B 79/005; A01B 76/00; G06T 17/05; Y02A 40/10
See application file for complete search history.

(56) References Cited

U.S. PATENT DOCUMENTS

| 5,751,576 A | 5/1998 | Monson |
| 6,128,574 A | 10/2000 | Diekhans |
(Continued)

FOREIGN PATENT DOCUMENTS

| CN | 2406458 Y | 11/2000 |
| CN | 106105446 A | 11/2016 |
(Continued)

OTHER PUBLICATIONS

"Applikationskarten teilflächenspezifisch und bedarfsgerecht", Agrosat, Geo-Konzept, XP055352080, 2015, pp. 1-4.
(Continued)

*Primary Examiner* — Brandon J Miller
(74) *Attorney, Agent, or Firm* — Lowenstein Sandler LLP

(57) ABSTRACT

The present invention relates to the technical field of precision farming. The present invention provides a method, a computer system and a computer program product with which a digital cultivation map for a field is created, said cultivation map comprising multiple zones, with at least one feature of at least one zone matched to at least one value of a machine working parameter that has been obtained from an image of the field.

10 Claims, 4 Drawing Sheets

(56) References Cited

U.S. PATENT DOCUMENTS

| | | | |
|---|---|---|---|
| 9,226,449 B2 | 1/2016 | Bischoff | |
| 9,652,840 B1* | 5/2017 | Shriver | G06T 7/0004 |
| 9,719,973 B2* | 8/2017 | Pickett | A01C 21/005 |
| 2007/0050117 A1* | 3/2007 | Kitzler | A01B 69/008 |
| | | | 701/41 |
| 2010/0222922 A1* | 9/2010 | Holland | A01B 79/005 |
| | | | 715/764 |
| 2013/0282423 A1* | 10/2013 | Hori | G06Q 50/02 |
| | | | 705/7.25 |
| 2015/0285647 A1* | 10/2015 | Meyer zu Helligen | |
| | | | A01B 79/005 |
| | | | 701/533 |
| 2018/0325021 A1* | 11/2018 | Connell | A01B 73/044 |
| 2019/0035071 A1* | 1/2019 | Klein | G06Q 10/20 |

FOREIGN PATENT DOCUMENTS

| | | | | |
|---|---|---|---|---|
| DE | 102012010912 B3 | 8/2013 | | |
| RU | 94035248 A | 12/1996 | | |
| WO | WO-0004341 A2 * | 1/2000 | | A01B 79/005 |
| WO | WO-00/23937 A1 | 4/2000 | | |
| WO | WO-2007050192 A2 * | 5/2007 | | A01B 69/008 |
| WO | WO-2016/032956 A1 | 3/2016 | | |
| WO | WO-2016/189468 A1 | 12/2016 | | |
| WO | WO-2017147682 A1 * | 9/2017 | | A01B 79/005 |

OTHER PUBLICATIONS

European Search Report for EP Patent Application No. 17198036.0, dated Mar. 28, 2018, 3 pages.

International Search Report for PCT Patent Application No. PCT/EP2018/078632, dated Jan. 18, 2019, 4 pages.

* cited by examiner

GENERATION OF DIGITAL CULTIVATION MAPS

SUMMARY

The present invention relates to the technical field of precision farming. The present invention provides a method, a computer system and a computer program product with which a digital cultivation map for a field is created, said cultivation map comprising multiple zones, with at least one feature of at least one zone matched to at least one value of a machine working parameter that has been obtained from an image of the field.

The term precision farming is understood to mean locally differentiated and targeted farming of agricultural land. The aim is to take account of the differences in the soil and yield capacity within an agriculturally utilized field.

There is increasing evaluation of satellite images, for example, in order to identify inhomogeneities in an agricultural utilized field and to match the further cultivation of the field to these inhomogeneities. For example, there are favored regions in every field in which the yield is higher than in the other (less favored) regions. In order to increase the yield in such favored regions, it is conceivable, for example, to plant crop plants more densely therein and/or to supply them with more nutrients. Conversely, there can be "problem regions" in which it is not worth using nutrients and/or crop protection agents for economic reasons. If such regions are known, it is possible to dispense with use of nutrients and/or crop protection agents.

For the automatic or semiautomatic cultivation of fields with reference to part-area-specific circumstances, it is possible to utilize digital cultivation maps. A digital cultivation map is a representation of the field and the various regions present in the field and of information as to how these regions should be cultivated, for example in order to achieve a maximum yield. WO00/23937 describes an example for generation of a digital cultivation map. The basis is a digital map of a field which is based on a photographic image and includes geographical length and width figures, such that determination of position is possible. A user is able to define management zones in this digital map. The user can assign formulations of substances (fertilizers, pesticides, herbicides) and amounts of these substance formulations to be applied to the management zones. The computer system can generate a dataset. This dataset (digital cultivation map) makes it possible for a farmer, with the aid of an appropriate vehicle, to drive to the different areas in the field that correspond to the management zones on the map and to apply the appropriate amounts of formulations according to the assignments made.

A further example of generation of digital cultivation maps is disclosed in WO2016/032956. In this example, in addition to the management zones known from WO00/23937, "learning blocks" are generated. By means of the learning blocks, the farmer is able to undertake variations in the cultivation of the field in order to see whether such variations have a positive or negative effect on yield. The farmer is able to test, for example, whether a smaller or elevated amount of an applied agent exerts a positive or negative effect. For this purpose, regions of defined size (blocks) are distributed in the field and then different amounts of applied agents are assigned to these blocks. The number of blocks and the variations in the amounts of applied agents are selected such that a statistical analysis of the yields gives information as to whether a particular variation is favorable or unfavorable. In this way, a farmer is able to optimize the cultivation of his field over a long period and hence aim for a maximum yield.

In the defining of management zones and learning blocks, the machine equipment available and its limitations should be taken into account. Agricultural cultivation machines have a defined working width, for example. The width of a zone and/or a learning block should if possible be a multiple of the working width of the agricultural cultivation machine. In addition, zones and/or learning blocks should be aligned in accordance with the optimal direction of movement (driving track) of the agricultural cultivation machine.

WO2016/032956 states that the defining of the learning blocks involves either manual orientation of driving tracks of the cultivation machines on the part of a user or ascertaining them from earlier planting spots. If the farmer has not recorded the earlier planting spots or these are no longer available, the second option falls away, and the user is forced to input the orientation manually. But manual input is error-prone and complex, especially when different zones have different orientations in the driving tracks.

It would be desirable if values of working parameters of agricultural cultivation machines could be ascertained automatically and taken into account in the creation of digital cultivation maps.

This is achieved by the present invention.

The present invention firstly provides a method comprising the steps of
- providing an image of a field for crop plants
- analyzing the image and identifying cultivation features that give information as to how the field has been cultivated by machine in the past
- ascertaining at least one value for at least one working parameter with reference to the cultivation features, especially from the cultivation features,
- creating a digital cultivation map for the field, said cultivation map comprising multiple zones, with at least one feature of at least one zone matched to the at least one value ascertained for the at least one working parameter.

The present invention further provides a computer system comprising
- a receiving unit for receiving an image of a field for crop plants and
- a processing unit configured so as to
  - analyze an image of a field for crop plants and identify cultivation features that give information as to how the field has been cultivated by machine in the past,
  - ascertain at least one value for at least one working parameter with reference to the cultivation features, especially from the cultivation features, and
  - create a digital cultivation map for the field, said cultivation map comprising multiple zones, with at least one feature of at least one zone matched to the at least one value ascertained for the at least one working parameter.

The present invention further provides a computer program product comprising a computer program which can be loaded into one or more working memories of a computer system and therein causes the computer system to execute the following steps:
- receiving an image of a field for crop plants
- analyzing the image and identifying cultivation features that give information as to how the field has been cultivated by machine in the past
- ascertaining at least one value for at least one working parameter with reference to the cultivation features, especially from the cultivation features, creating a digital cultivation map for the field, said cultivation map comprising multiple zones, with at least one feature of at least one zone matched to the at least one value ascertained for the at least one working parameter.

Preferred embodiments of the invention can be found in the dependent claims and in the present description.

The invention is explained in detail hereinafter without distinguishing between the subjects of the invention (method, computer system, computer program product). Instead, the elucidations that follow are intended to be analogously applicable to all subjects of the invention, irrespective of their context (method, computer system, computer program product).

If steps are mentioned in a particular sequence in the description or in the claims, this does not necessarily mean that the steps must indeed be executed in the sequence specified. Instead, the invention should be understood such that the steps listed in a sequence can be executed in any sequence or else in parallel to one another, unless a step is based on another step, which becomes clear in each case from the description of the steps. The sequences listed specifically in this document are accordingly merely preferred embodiments of the invention.

According to the present invention, one image or multiple images of a field for crop plants are utilized in order to ascertain at least one value of at least one working parameter for machine cultivation of the field and to introduce this value into the creation of a digital cultivation map.

The term "crop plant" is understood to mean a plant that is purposely grown as a useful or ornamental plant through human intervention.

The term "field" is understood to mean a spatially delimitable region of the surface of the Earth which is in agricultural use by planting of crop plants in such a field, supplying them with nutrients and harvesting them. An individual variety of a crop plant can be cultivated in a field; however, different varieties of a crop plant and/or different crop plants can also be cultivated. It is also conceivable for a field to comprise one region or a plurality of regions in which no crop plants are cultivated and/or are being cultivated.

The term image is understood to mean an image of a field or a region of a field. The image is typically two-dimensional; but a three-dimensional image is also conceivable.

The image is typically a digital image; but the use of analog images is also conceivable in principle.

The term "digital" means that the image has discrete pixels and is in a form in which it can be sent to machine processing, usually by a computer system. In order to minimize the demand for memory, it is customary for the digital image to be binary-coded and optionally compressed.

"Machine processing" is understood to mean the known electronic data processing (EDP) methods.

The images utilized in the context of the present invention show a field or part of a field, typically viewed from above. They are typically generated with the aid of one or more remote sensors; a digital image thus comprises, for example, remote sensing data.

"Remote sensing data" is digital information that has been obtained remotely from the surface of the Earth, for example by satellites. The use of aircraft (unmanned (drones) or manned) for recording remote sensing data is also conceivable.

In a first step of the method of the invention, at least one image of a field for crop plants is provided.

The images may be sourced, for example, from publicly available or commercial databases. There is a number of suppliers of remote sensing data at various processing stages. Typically, at first based on the geocoordinates of a field in question, at least one digital image that shows the field or part of the field at a past juncture is loaded from a database onto the computer system of the invention, for example via the Internet.

It is also conceivable that the image is generated as an aerial image by a manned or unmanned (drone) aircraft.

Preference is given to using satellite images of the surface of the Earth.

The images utilized in accordance with the invention include features that originate from past cultivation of the field. In a further step of the method of the invention, the at least one image is analyzed in order to identify such cultivation features.

The images can be created using any contrast mechanism that permits any kind of conclusion as to how the field has been cultivated in the past. For instance, the cultivation may, for example, leave topographic traces, for instance furrows, in the field that then, for example, reflect visible light differently and cause a contrast in an optical image of the field. However, the cultivation may also, for example, alter the vegetation density, the soil moisture content or other parameters, which can in turn alter the light emission of the field in other wavelength regions, for example in the infrared spectrum.

The method here is also not fundamentally restricted to imaging by remote sensing. Optical imaging can also be effected with a smartphone, for example, in which case it is also possible, for example, to use smartphones additionally having an infrared camera. The method can then also be conducted without drawing on corresponding external data sources for images, for example when only a narrowband or even no network connection is available at the site of the field.

The term "image" should additionally also not be interpreted in a restrictive manner in that light from a particular spatial region is projected by an optical system onto an analog or digital image sensor, for example divided into pixels. Instead, the field can, for example, also be scanned gradually with a laser beam. It is then possible, at any point in the scan, to examine the effect of the field on the laser beam and assign it to this point in the image, for example in the form of a gray value.

The contrast mechanism used for the imaging is also not restricted to physical action on the field itself, i.e. on the soil. Instead, it is also possible, for example, for the cultivation of the field to have an effect on the atmosphere above, which can then in turn be measured by remote sensing. For example, according to the respective local characteristics of the field, it is possible for different amounts of moisture to be released into the atmosphere, or for an altered coefficient of reflection of the sunlight to lead to locally different heating of the atmosphere, which can then be detected by remote sensing in each case.

The at least one image is preferably analyzed by the computer system/computer program of the invention. Image analysis can be accomplished using standard methods of pattern recognition. Machine learning methods are also conceivable, for example the use of artificial neural networks. The purpose of image analysis is to identify features in the image that result from earlier cultivation of the field.

For the analyzing of the image, it is possible to use any methods of machine vision. For example, the image can be classified by an artificial neural network or another AI module as to whether particular types of cultivation traces are present therein. When the cultivation features are those that can have a greater or lesser extent in quantitative terms, this extent can also be ascertained, for example, by a regression analysis.

Typical cultivation features are: field boundaries, driving tracks, driving lanes, headlands, field margins, ploughing strips, flower strips, access routes, plant separations, drainage features, for example irrigation and/or drainage channels, fences, demarcations, means of protection from soil erosion (for example woods) and the like. More particularly, all cultivation features may be selected from this list. As indicated above, however, the term "cultivation feature" is not limited to such topographically visible features, but may also include, for example, a change in the moisture content, vegetation density or else chemical composition of the soil.

"Driving lane" refers to the part of the field driven over repeatedly for care measures during the growth of the crop plant. Usually, the strips driven over are not sown in order to save seed. Driving lanes are typically aligned parallel at a distance of 12 to 36 meters. This depends particularly on the equipment in operation. Particularly field sprayers and fertilizer distributors define the separation of the driving lanes via their working widths. Typically, sowing commences at half the driving lane separation (i.e. 6-18 meters depending on the operation, see above) from the edge. A driving lane is also included at the headland. Subsequently, the remaining tracks are aligned at a separation of the full driving lane width, parallel to the longer side of the field.

Particularly advantageously, at least one boundary of a zone corresponds to at least part of a boundary of a driving lane. This has the effect that the driving lane is not cultivated by the cultivation machine. Consumable material, for instance seed, nutrient or crop protection agent, does not aid the growth of crop plants in the driving lane. The application of water or even ploughing could even impair the usability of the driving lane.

"Headland" in agriculture refers to the marginal region of a field for turning round in the course of cultivation, for example by tractor when ploughing. In the case of the customary strip cultivation, a field thus has one headland at each of two opposite sides. These are usually the two shorter sides since longitudinal cultivation is associated with fewer turning operations overall and hence is more economic. Headland areas are cultivated at right angles to the normal direction of cultivation and parallel to the field edge and, depending on the operation, before (harvesting, corn sowing) or after (normal cropping) the cultivation of the main plot.

A "marginal strip" is a marginal region of fields that is farmed without the use of crop protection agents in order that wild field plants can spread there. By contrast with "flower strips" that are sown with a flower mixture in the spring, the aim of the marginal strips is to promote the wild field plants (segetal plants) borne by the local soil.

The cultivation features accordingly show how the field has been cultivated in the past and how the field could accordingly also be cultivated in the future. In a further step, at least one value for at least one working parameter is ascertained with reference to the cultivation features identified, especially from the cultivation features identified. This is preferably ascertained by means of the computer system/computer program of the invention.

A working parameter determines how an agricultural cultivation machine is used in the field. This is understood to mean, for example, a program for the movement of the cultivation machine in terms of place and/or time, but also, for example, a program for the nature or intensity of cultivation measures conducted by the machine, such as ploughing or introduction of any substances, in terms of place and/or time.

The term "agricultural cultivation machine" encompasses any apparatus which moves or is moved over or through a field as it executes an agricultural measure.

Examples of agricultural cultivation machines are, for example, fertilizer distributor, mower, mulcher, planter, plough, seed drill, field sprayer and the like (see also, for example, http://www.wikiwand.com/de/Liste_landwirtschaftlicher_Gerate_und_Maschinen).

The term "agricultural measure" is understood to mean any measure in the field for crop plants that is necessary and/or economically viable and/or environmentally advisable in order to obtain a plant product. Examples of agricultural measures are: soil cultivation (e.g. ploughing), deploying the seed (sowing), irrigation, removal of weed plants/weed grasses, fertilizing, control of harmful organisms, deployment of crop protection agents, harvesting and the like.

The term "crop protection agent" is understood to mean an agent which is used to protect plants or plant products from harmful organisms or to prevent their effect, to destroy unwanted plants or plant parts, to inhibit unwanted growth of plants or to prevent such growth and/or to influence the life processes of plants in a different manner than nutrients (for example growth regulators). Examples of crop protection agents are herbicides, fungicides and pesticides (for example insecticides).

Some of the values for working parameters are defined by the agricultural cultivation machines available, for example the track width; others are variable and can thus be optimized, for example the driving routes and driving directions. The working parameters under consideration in accordance with the invention especially include those that exert an influence on the extent and/or shape and/or alignment and/or location of a region which is cultivated by an agricultural cultivation machine, especially driving routes, driving directions, track widths, working widths, plant separations and the like. What these working parameters have in common is that they can be adjusted only with difficulty, if at all, during the cultivation of the field with the cultivation machine.

However, the available working parameters also include, for example, the driving speed, the penetration depth or a pressure applied by a plough, and/or a deployment rate for a type of seed, for a nutrient, for a fertilizer, for a plant protection agent or for water, although these working parameters can be varied comparatively rapidly even during cultivation.

In a further step of the method of the invention, a digital cultivation map is created for the field. The digital cultivation map is a digital representation of the field or of part of the field. It has geographic location information that can be verified with the aid of a positioning system, for example, in order to be able to navigate an agricultural cultivation machine in the field on the basis of the cultivation map. Suitable positioning systems are often summarized by the term GPS (global positioning system).

The digital cultivation map has a multitude of zones. This means that the field or the part of the field represented by the cultivation map is divided into multiple regions corresponding to the zones. It is typically a characteristic feature of a zone that the region of the field represented by the zone is relatively homogeneous in relation to one or more yield factors that influence the yield of the region. The zones are often defined such that the at least one yield factor varies less within the zone than between two different zones. It is a characteristic feature of a zone that the region of the field represented by the zone is to be cultivated in an agriculturally homogeneous manner, whereas at least one value of one working parameter of the agricultural cultivation machine is to be altered at the transition from one zone to another zone. It is conceivable, for example, that different amounts or concentrations of a crop protection agent to be applied or different amounts of nutrients or different compositions of application media or different cultivation methods or different amounts of water for irrigation or the like are assigned or to be assigned to different zones.

The zones may be "conventional" management zones as described, for example, in WO00/23937. The zones may also be learning blocks as disclosed, for example, in WO2016/032956.

In the defining of the zones, the at least one ascertained value of the at least one working parameter is now taken into account by matching at least one feature of at least one zone to the at least one ascertained value for the at least one working parameter.

Features of a zone are, for example: location, extent, size, shape, alignment and the like.

As already described, a zone in the digital cultivation map represents a region of a field in the real world. In other words, a zone in the digital cultivation map corresponds to a region in the field. Accordingly, the location of the zone in the cultivation map corresponds to the geographic position of the corresponding region in the field.

The identified cultivation features give information as to the past machine cultivation of the field. This machine cultivation embodies the empirical knowledge of those persons who defined or controlled this cultivation to date. This knowledge is frequently not recorded in written form and cannot even be easily expressed in words for such a record. It is thus frequently stored solely in the memories of the persons involved. Because the cultivation features now go into the defining of working parameters, the empirical knowledge can be recorded and laid down. It is thus possible to ensure that the empirical knowledge is not lost if the persons involved to date, for example, die or change employer. More particularly, it is made easier to hand over the cultivation of the field from one person to another, for example in the event of a change of generation. The cultivation of the field can be continued reproducibly in accordance with said empirical knowledge by cultivating the field by machine in accordance with the working parameters that have in turn been ascertained with reference to the cultivation features.

Even if the cultivation of the field does not switch from one person to another, the reproducibility of the machine cultivation is already increased. To date, many machines used for agricultural cultivation have been operated manually. For many working parameters, there was no time program defined a priori that was implemented, nor was a time program that was actually run by manual actuation available for reuse. Once created, a digital cultivation map, by contrast, can be used time and again.

The referencing of cultivation parameters for the ascertaining of working parameters can also extend to a history of cultivation parameters over time. For example, it is frequently advisable in agriculture, for prevention of soil leaching, to grow different crop plants in a particular crop rotation. Accordingly, a history of multiple cultivations executed successively in one and the same region of the field may be of relevance for the determining of working parameters for future cultivation.

As elucidated above, the time program of the working parameters specifically run in the machine cultivation of a field does not depend solely on the biological circumstances of the field itself, for example the inhomogeneities in the characteristics of the soil. Instead, many working parameters are also tied to machines specifically used. If, in the cultivation of the field, a switch is made from a machine used to date to a new machine that has a greater working width, for example, or emits a spraying medium with a different spatial distribution, the working parameters should be adapted to the new machine. If working parameters are ascertained in an automated manner with reference to the cultivation features, the adjustment to a new machine can also be effected in the same way. This obviates any need to adapt the working parameters to the altered characteristics of the new machine by manual trial and error.

The working parameters, once ascertained, need not remain unchanged for the further cultivation of the field. Instead, it is also possible, for example, to use these working parameters as starting point for computer-assisted optimization. It is thus possible, for example, to effectively read in existing empirical knowledge in the form of the cultivation features, and then, building on that, to ascertain working parameters that not just more or less accurately reproduce the cultivation to date but offer added value by comparison. The optimized working parameters can, for example, accelerate cultivation, improve the yield of crop plants achieved or minimize the use of consumable materials such as nutrients, fertilizers or spraying media.

In the defining of the working parameters for the digital cultivation map, it is additionally possible to refer to any other additional information, if available. For example, the density of crop plants or of weed infestation can be analyzed from images or other measurements. It is also possible, for example, to refer to data as to the characteristics of the soil, for instance a spatially inhomogeneous distribution of the composition or of the moisture content ascertained from measurements.

Thus, the zones should also be distinguished from associated regions apparent in the image that were cultivated in a similar manner in the past. Especially in the case described in which the field is to be cultivated in the future with different cultivation machines than before, the digital cultivation map may quite possibly result in an entirely new subdivision of the field into zones.

According to the shape of the zone, the coordinates of a different number of points may be required to unambiguously fix the location of the zone in the cultivation map (and hence the location of the corresponding region in the field). In the case of a two-dimensional cultivation map and a rectangular zone with otherwise straight (uncut) edges, for example, the coordinates of the four corners are sufficient to unambiguously fix the location of the zone.

The extent of the zone in the cultivation map corresponds to the extent of the corresponding region in the field. "Extent" is understood to mean the extent in at least one direction. The extent may, for example, be the length or width of the zone. The extent may alternatively also be the maximum extent or the minimum extent. Preferably, the extent is the extent at right angles to the cultivation direction of the corresponding region. The cultivation direction is that direction in which an agricultural cultivation machine moves or is moved when it is implementing an agricultural measure in the corresponding region.

The size of the zone in the cultivation map corresponds to the size of the corresponding region in the field, with "size" typically being understood to mean the area.

There is an optimum with regard to the size of the zones. The smaller the individual zones chosen, the more accurately the spatial distribution of the in the actual cultivation of the field by the cultivation machine can be matched to a target distribution ascertained beforehand. On the other hand, the larger the individual zones chosen, the more quickly the field can be cultivated overall.

The computer-assisted optimization of the digital cultivation map, i.e. the obtaining of a spatial target distribution of one or more working parameters over the area of the field, can be effected in various ways, utilizing the empirical knowledge embodied in the cultivation features and previously read in by analyzing the image. The optimization method may especially be guided by what value is ascribed to said empirical knowledge.

The objective for the optimization may especially include a quality function containing a term for each of the properties to be optimized, with relative weighting of the terms, for example in the form of a weighted sum. The properties to be optimized may, for example, be an overall yield of the field, a time required for the cultivation of the complete field, and one or more consumptions of seed, water, fertilizer, nutrient, crop protection agent or seed. The quality function may also be limited by boundary conditions, for example environmental regulations for maximum load of fertilizers or crop protection agents on the soil or for maximum water consumption. The terms in the quality function may be independent of one another or else may interact with one another.

For example, the weightings in the quality function may be ascertained wholly or partly from the cultivation features that are obtained from the analysis of the image. However, the cultivation features ascertained may also be referred to, for example, in order to ascertain starting values for those working parameters that are the subject of the optimization.

However, it may also be an aim of the optimization for particular cultivation features defined on account of the image analysis to be conserved if the future cultivation of the field is to be in accordance with the new digital cultivation map. The quality function may then include a term, for example, that penalizes a change in these cultivation features. The motivation behind this is not to completely throw overboard the empirical knowledge with which past success has been achieved.

The shape of the zone in the cultivation map corresponds to the shape of the corresponding region in the field. A zone is typically an area. The area may be n-angular where n is an integer greater than two (e.g. triangular, tetragonal, pentagonal etc.); it may be rectangular, square, trapezoidal, diamond-shaped, round, oval, elliptical, or have any other shape. The area preferably has a shape in which two sides run parallel to one another at a constant distance. The area is preferably rectangular, diamond-shaped, trapezoidal, or has the shape of a parallelogram.

The alignment of the zone in the cultivation map corresponds to the alignment of the corresponding region in the field. Alignment is understood to mean the orientation of two sides of a two-dimensional zone that run parallel to one another. The orientation indicates the directions (for example in the form of the points of the compass) in which the sides running parallel extend. The alignment typically corresponds to the cultivation direction (while the extent is at right angles thereto).

According to the invention, at least one feature of at least one zone is thus matched to at least one ascertained value for at least one working parameter. "Matching" is understood to mean that the value ascertained is used to define the feature.

For example, it is conceivable to allow the boundaries of a zone to coincide with boundaries of driving tracks.

Typically, the feature is calculated from the value or with the aid of the value. For example, it is conceivable to fix the extent of a zone in one direction, for example at right angles to a cultivation direction, to a multiple, especially a whole multiple, of the working width of an agricultural cultivation machine. In this way, the working capacity of the cultivation machine is exploited optimally since the zone can then be cultivated by the cultivation machine in overlap-free lanes without leaving any region of the zone uncultivated.

A further advantageous contribution can be made to this optimal exploitation when two boundaries of the at least one zone that run parallel to one another run parallel to a cultivation direction of an agricultural cultivation machine.

The digital cultivation map created can be displayed to a user on a screen, or the user can download it onto a storage medium or a mobile computer system (e.g. a tablet computer or a smartphone). It is also conceivable that the digital cultivation map is transmitted to a computer system which is part of an agricultural cultivation machine. If an agricultural cultivation machine having a positioning system is moved (or moves autonomously) across a field or through a field, the actual position can be verified with the location information from the digital cultivation map in order to ascertain the zone in which the agricultural cultivation machine is currently present. Typically, the zones (or the corresponding regions in the field) are cultivated differently. Working instructions are typically recorded in the cultivation map. When a zone boundary is crossed, preference is given to adjusting/amending a working parameter in accordance with the working instructions.

The method of the invention may be executed entirely or partly on a computer system (for example the computer system of the invention).

A computer system comprises one or more computers. The term "computer" is understood to mean a universally program-controlled machine for information processing. A computer has at least one input unit by means of which the data and control commands can be input (mouse, trackpad, keyboard, scanner, webcam, joystick, microphone, barcode reader etc.), a processing unit comprising working memory and processor with which data and commands are processed, and an output unit in order to transmit data from the system (e.g. screen, printer, loudspeaker etc.). Modern computers are often divided into desktop computers, portable computers, laptops, notebooks, netbooks and tablet computers, and what are called handhelds (e.g. smartphones, smartwatches). However, the term "computer" also includes, for example, embedded systems as used in modern agricultural cultivation machines.

However, the term "computer system" is not supposed to imply that all components of this system are in one place. For example, it is also possible for different parts of the processing unit to be present on different physical computers in different places. For example, the analysis of the image can take place on a supplier's external server specialized for the acquisition of such images and their analysis by any features. The translation of cultivation features into working parameters may involve, for example, a manufacturer of cultivation machines which acts as the source for the information as to how changes in working parameters affect the cultivation outcome.

The computer system of the invention includes a receiving unit for receiving an image of a field for crop plants. Typically, the computer system of the invention is connected to a database via a network (e.g. the Internet). In that case, the computer system of the invention is configured such that it can call up images of a field or of part of a field from the database and read them into a working memory of the computer system of the invention or in order to store them on a data storage means (for example a hard drive) of the computer system of the invention. It is also conceivable that a user of the computer system of the invention holds an image on a separate data storage means (e.g. a USB memory stick) and connects this to the computer system of the invention via an interface (e.g. via the USB socket) in order to transfer the image to the computer system of the invention.

The computer system of the invention also includes a processing unit configured so as to analyze the image and identify cultivation features that give information as to the past machine cultivation of the field, to ascertain at least one value for at least one working parameter from the cultivation features, and to create a digital cultivation map for the field, said cultivation map comprising multiple zones, with at least one feature of at least one zone matched to the at least one value ascertained for the at least one working parameter.

The computer system of the invention typically has a display unit (e.g. a screen) in order that a user can control and verify the steps that the computer system implements and/or view a display of the digital image and/or the digital cultivation map.

The computer system of the invention typically has an output unit with which a digital cultivation map can be transmitted to another computer system and/or a storage unit.

There follows a detailed description of the invention with reference to examples and figures, but without wishing to restrict the invention to the features or combinations of features mentioned in the examples.

DESCRIPTION

Figure 1:
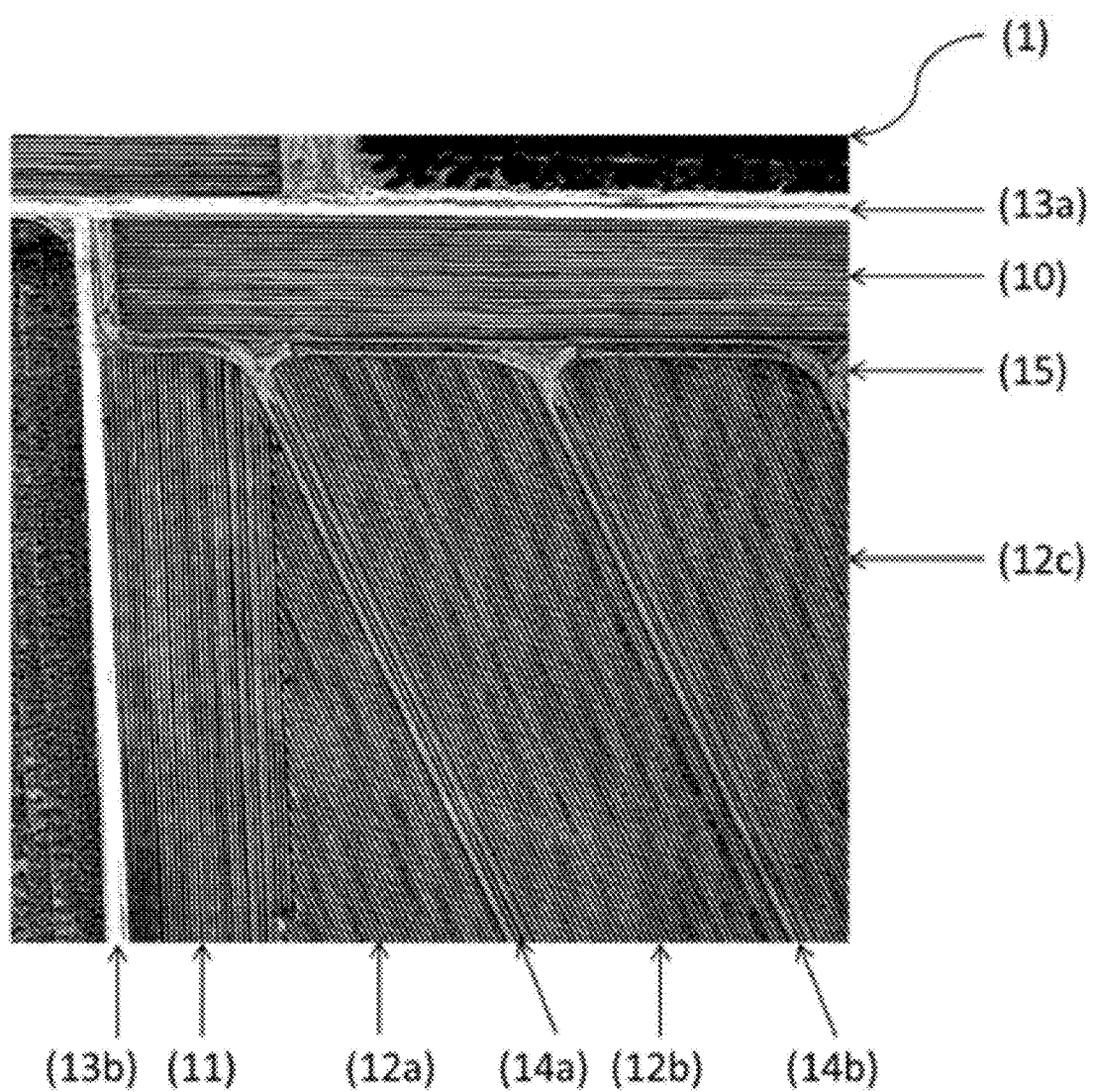
FIG. 1 shows a satellite image of part of a field viewed from above.

FIG. 1 shows a satellite image (1) of part of a field viewed from above. The satellite image is shown in a black-and-white representation.

A multitude of cultivation features are apparent, which indicate the past cultivation of the field.

The part of the field shown can be divided into three regions that are delimited from one another by different cultivation directions. A first region (10) has horizontal lines that indicate that this region has been cultivated from left to right and/or from right to left along the lines. The lines, their alignment, their separation from one another and their number constitute cultivation features that can be identified by means of image analysis.

A second region (11) has vertical lines that indicate that this region has been cultivated from the top downward and/or from the bottom upward. The lines, their alignment, their separation from one another and their number constitute cultivation features that can be identified by means of image analysis.

A third region (12a, 12b, 12c) has lines that extend from top left to bottom right and indicate that this region has been cultivated from top left to bottom right and/or from bottom right to top left along the lines. The lines, their alignment, their separation from one another and their number constitute cultivation features that can be identified by means of image analysis. The third region (12a, 12b, 12c) can be divided into three subregions (12a), (12b) and (12c) that are separated from one another by driving lanes (14a, 14b). Additionally apparent in the interface region between the regions (10) and (12b, 12c) are headlands (15).

The location and width of the driving lanes and headlands are cultivation features that can be identified by image analysis.

The field shown in part in the satellite image is bounded on two sides by the access routes (13a) and (13b). The location and width of the access routes are cultivation features that can be identified by image analysis.

Figure 2:
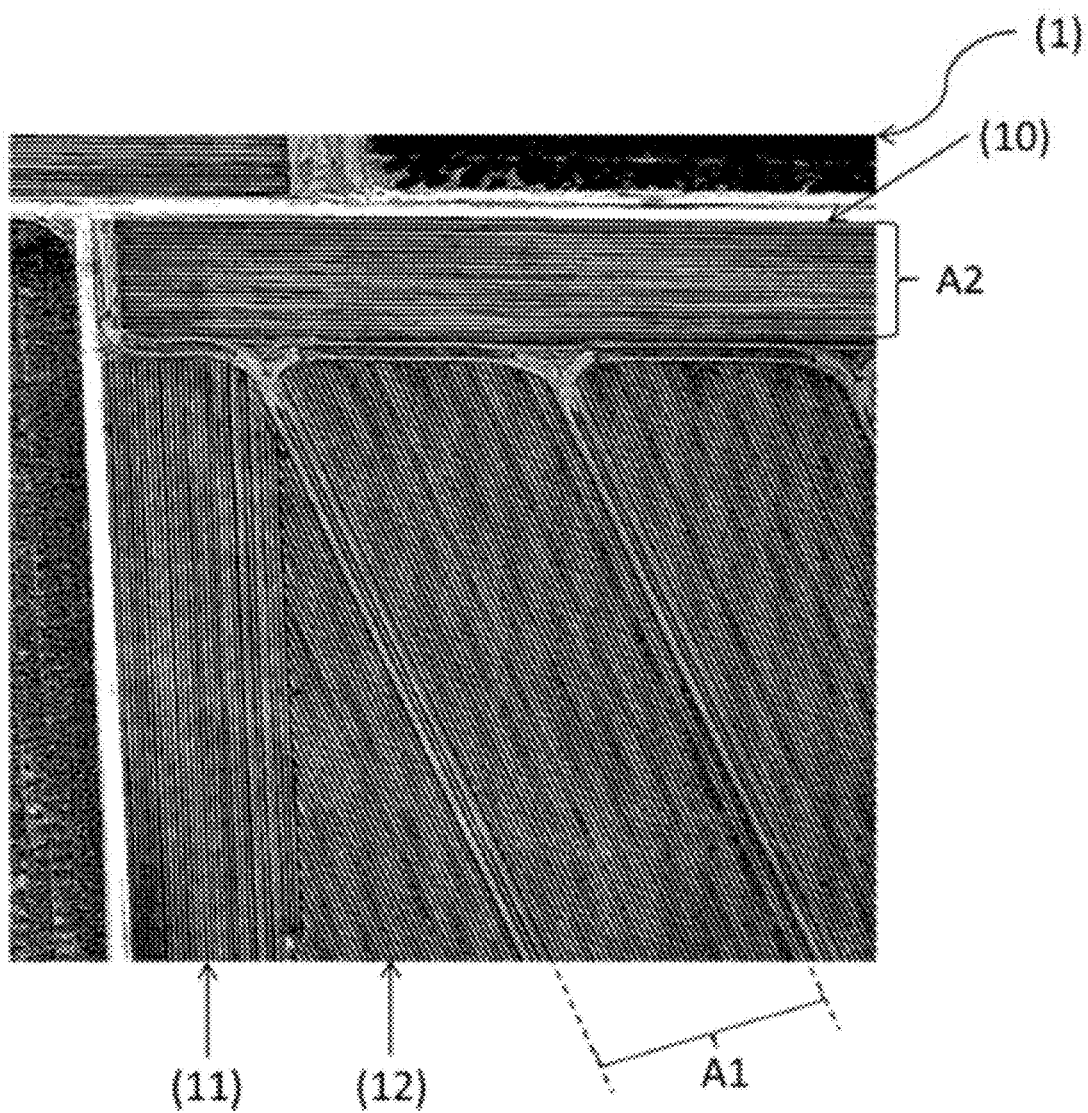
FIG. 2 shows by way of example the working parameters of which values can be ascertained from cultivation features in FIG. 1.

FIG. 2 shows by way of example the working parameters of which values can be ascertained from cultivation features in FIG. 1.

The distances A1 and A2 can be used, for example, to ascertain values for the working width of the agricultural cultivation machine.

The widths of driving lanes, headlands and access routes can be used to ascertain values for maximum lane widths of the agricultural cultivation machine. The directions in which the lines run in the field regions (10), (11) and (12) can be used to ascertain preferred cultivation directions.

Figure 3:
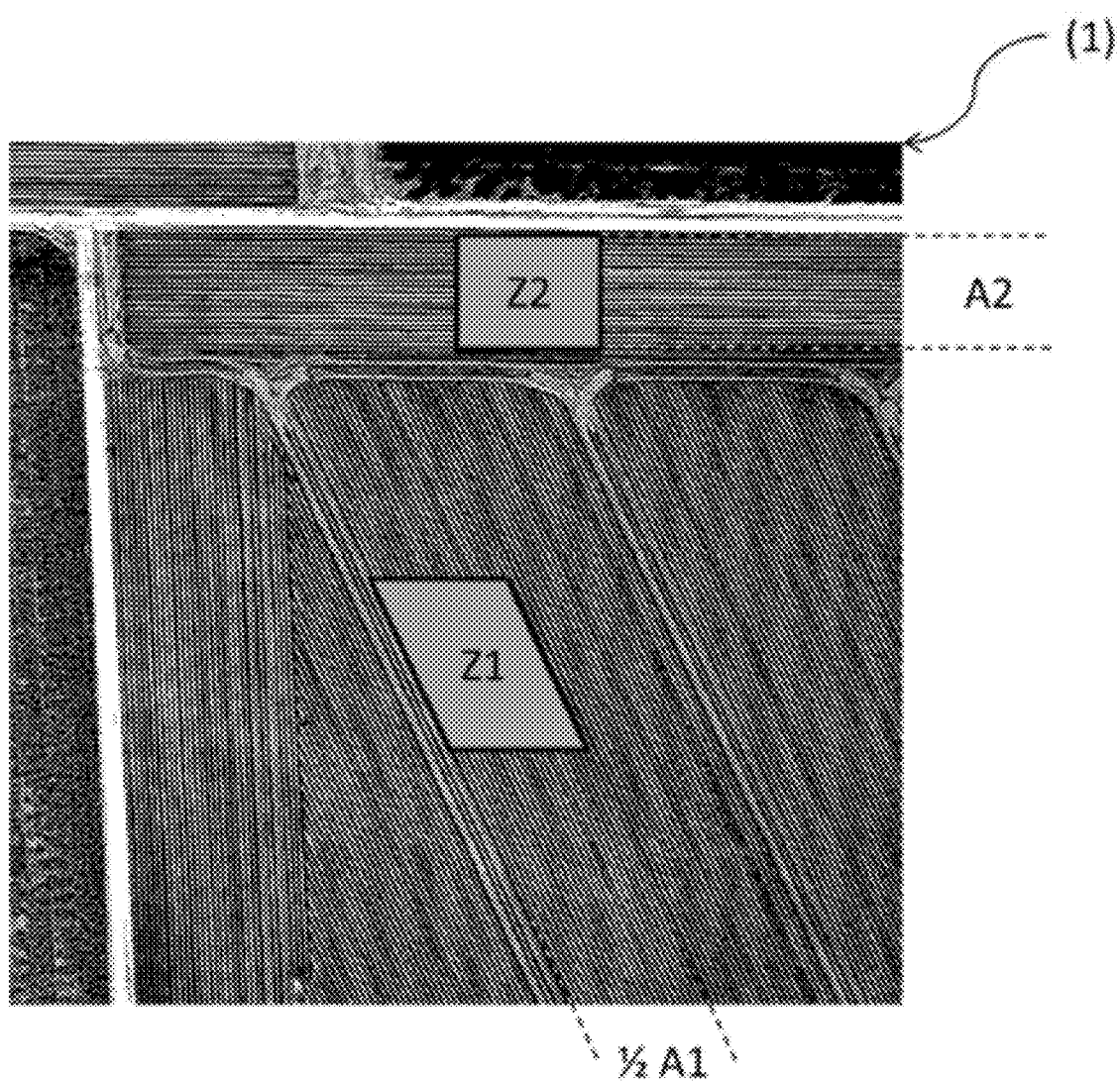
FIG. 3 shows a schematic of the defining of zones for a map.

FIG. 3 shows a schematic of the defining of zones. Two zones (Z1) and (Z2) are drawn on the map. Features of the zones are matched to values for working parameters. It is the extent of zone Z1 in one direction (at right angles to cultivation direction) exactly half the working width A1, and the extent of zone Z2 in one direction (at right angles to cultivation direction) exactly the working width A2.

Figure 4:
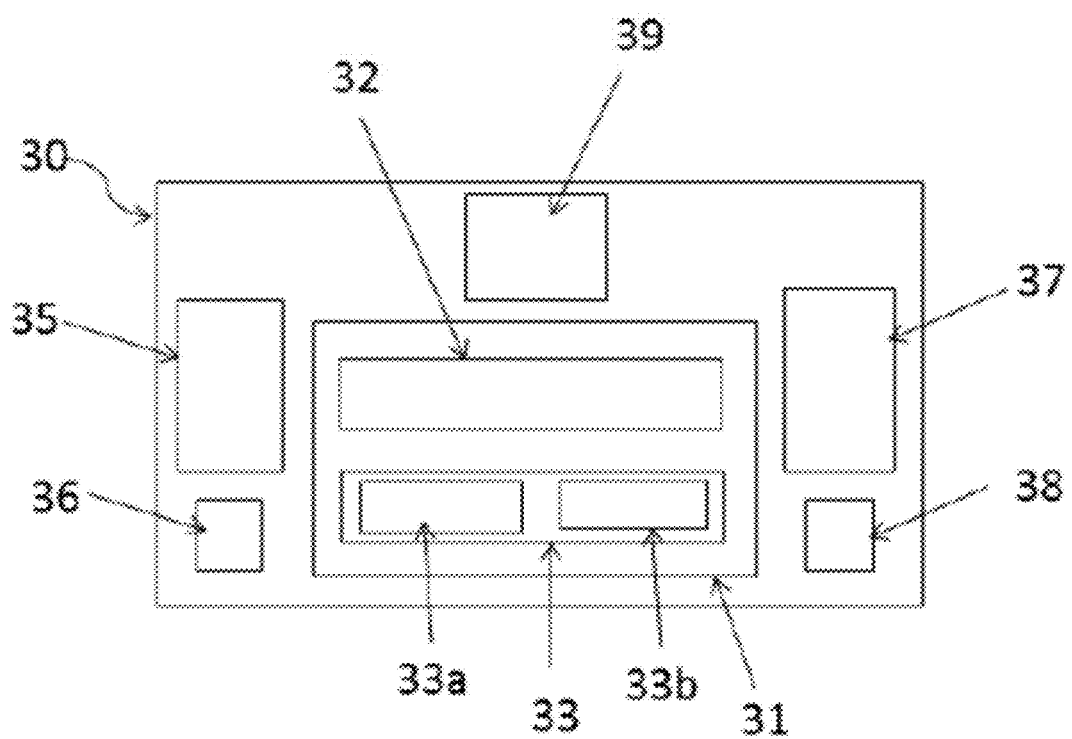
FIG. 4 shows a schematic of an example of the construction of a computer system of the invention.

FIG. 4 shows a schematic of an example of the construction of a computer system of the invention.

The computer system (30) comprises an input unit (35) with which a user can input data and control commands. It comprises a processing unit (31) for processing data and control commands. The processing unit (31) has a working memory (32) and a processor (33). The processor (33) comprises a control unit (33a) and an arithmetic unit (33b). The computer unit (30) further comprises an output unit (37) with which data can be output. The computer unit (30) further comprises a data storage means (39), a receiving unit (36) with which signals and/or data can be received from external devices, and a transmitting unit (39) with which signals and/or data can be sent to external devices.

There follows a description by way of example of one embodiment of the method of the invention. A user utilizes the computer system of the invention on which the computer program of the invention is installed.

The computer system provides the user with a digital map. By means of an input device, for example a mouse, the user is able to change the section of the map and zoom into the map or zoom out of the map, such that he is able to display a particular field on the map. In the map, the user is able to select a specific field, for example by drawing field boundaries. It is alternatively conceivable that field boundaries are recognized automatically by means of image analysis and the user can select a recognized field, for example by clicking on it with the mouse.

On the basis of the field selected, the computer system calls up one or more digital images from a database, for example via the Internet, that show the field at an earlier juncture. It is conceivable that the user inputs past dates or a period of time of particular interest into the computer system. It is conceivable that one or more images called up are displayed to the user and he selects that/those on which cultivation features that show how the field has been cultivated in the past and how it is also to be cultivated in the future are apparent.

The computer system analyzes one or more digital images and identifies cultivation features.

It is conceivable that the computer system displays the cultivation features identified on the screen. It is conceivable that the user selects those cultivation features that are to form the basis of ascertaining values for working parameters.

The computer system ascertains at least one value for at least one working parameter from the cultivation features.

The computer system creates a digital cultivation map for the field, said cultivation map comprising multiple zones, with at least one feature of at least one zone matched to the at least one value ascertained for the at least one working parameter.

It is conceivable that the computer system displays the digital cultivation map on the screen.

It is conceivable that the user loads the digital cultivation map onto a control system for an agricultural cultivation machine.

It is conceivable that the user executes an agricultural measure with the aid of the agricultural cultivation machine, with a change in at least one working parameter of the agricultural cultivation machine when passing from a region of the field corresponding to one zone in the cultivation map to another region of the field corresponding to another zone in the cultivation map.

The creation of the digital cultivation map may be offered, for example, as an external service since it can in principle be created on the basis of remote sensing of the field, i.e. without physical presence in the field. Therefore, the invention also relates to a digital cultivation map for the agricultural cultivation of a field that has been obtained by the method described.

What is claimed is:

1. A method comprising the steps of
providing an image of a field for crop plants,
analyzing the image and identifying cultivation features that give information as to how the field has been cultivated by machine in the past,
displaying the identified cultivation features on a screen of a computer system on the part of a user,
selecting displayed identified cultivation features on the part of the user,
ascertaining at least one value for at least one working parameter based on the selected cultivation features,
creating a digital cultivation map for the field, and
determining one or more zones of the digital cultivation map based on defining at least one feature of a zone using the at least one value ascertained for the at least one working parameter, wherein the at least one feature of the zone is selected from a location, an extent, a size, a shape, an alignment, or a combination thereof,
wherein the extent of at least one zone at right angles to a cultivation direction is a whole multiple of the working width of an agricultural cultivation machine, and
wherein at least one cultivation feature of the identified cultivation features comprises one of the following: driving tracks, ploughing strips, and flower strips.

2. The method according to claim 1, wherein the image is analyzed in an automated manner by means of computer-implemented methods of image analysis.

3. The method according to claim 1, wherein the image is an aerial image or a satellite image.

4. The method according to claim 1, wherein the at least one working parameter is selected from the following list: driving route, driving direction, track width, working width, plant separation.

5. The method according to claim 1, wherein at least one boundary of a zone coincides with at least part of a boundary of a driving lane.

6. The method according to claim 1, wherein two boundaries of the at least one zone that run parallel to one another run parallel to a cultivation direction of an agricultural cultivation machine.

7. The method according to claim 1, comprising the following steps:
calling up a digital map of a field to the screen
retrieving at least one digital image showing the field at an earlier juncture from a database on the computer system
automatically analyzing the image and identifying cultivation features that give information as to how the field has been cultivated by machine in the past
automatically ascertaining at least one value for at least one working parameter from the selected cultivation features
automatically creating a digital cultivation map for the field, said cultivation map comprising multiple zones, with at least one feature of at least one zone matched to the at least one value ascertained for the at least one working parameter
displaying the digital cultivation map on the screen
loading the digital cultivation map to a control system for an agricultural cultivation machine
executing an agricultural measure with the aid of the agricultural cultivation machine, with a change in at least one working parameter of the agricultural cultivation machine when passing from a region of the field corresponding to one zone in the cultivation map to another region of the field corresponding to another zone in the cultivation map.

8. A digital cultivation map for the agricultural cultivation of a field, obtained by a method according to claim 1.

9. A computer system comprising
a receiving unit for receiving an image of a field for crop plants, and
a processing unit configured so as to:
analyze an image of a field for crop plants and identify cultivation features that give information as to the past machine cultivation of the field,
display the identified cultivation features on a screen of a computer system on the part of a user,
select displayed identified cultivation features on the part of the user,
ascertain at least one value for at least one working parameter based on the selected cultivation features,
create a digital cultivation map for the field, and
determine one or more zones of the digital cultivation map based on matching at least one feature of a zone to the at least one value ascertained for the at least one working parameter, wherein the at least one feature of a zone is selected from a location, an extent, a size, a shape, an alignment, or a combination thereof, wherein the extent of at least one zone at right angles to a cultivation direction is a whole multiple of the working width of an agricultural cultivation machine, and wherein at least one cultivation feature of the identified cultivation features comprises one of the following: driving tracks, ploughing strips, and flower strips.

10. A non-transitory storage medium on which a computer program is stored, which can be read into the working memory of a computer system, and causes the computer system to execute the following steps:

receiving an image of a field for crop plants, analyzing the image and identifying cultivation features that give information as to how the field has been cultivated by machine in the past, displaying the identified cultivation features on a screen of a computer system on the part of a user, selecting displayed identified cultivation features on the part of the user, ascertaining at least one value for at least one working parameter based on the selected cultivation features, creating a digital cultivation map for the field, and determining one or more zones of the digital cultivation map based on matching at least one feature of a zone to the at least one value ascertained for the at least one working parameter, wherein the at least one feature of a zone is selected from a location, an extent, a size, a shape, an alignment, or a combination thereof, wherein the extent of at least one zone at right angles to a cultivation direction is a whole multiple of the working width of an agricultural cultivation machine, and wherein at least one cultivation feature of the identified cultivation features comprises one of the following: driving tracks, ploughing strips, and flower strips.

* * * * *